United States Patent
Salem et al.

(10) Patent No.: US 10,268,182 B2
(45) Date of Patent: Apr. 23, 2019

(54) DETECTION OF THE INTEGRITY OF ADDITIVELY MANUFACTURED PARTS

(71) Applicant: MRL Materials Resources LLC, Dayton, OH (US)

(72) Inventors: Ayman A. Salem, Beavercreek, OH (US); Daniel P. Satko, Centerville, OH (US); Joshua B. Shaffer, Centerville, OH (US)

(73) Assignee: MRL MATERIALS RESOURCES LLC, Dayton, OH (US)

( * ) Notice: Subject to any disclaimer, the term of this patent is extended or adjusted under 35 U.S.C. 154(b) by 15 days.

(21) Appl. No.: 15/718,741

(22) Filed: Sep. 28, 2017

(65) Prior Publication Data

US 2018/0088559 A1    Mar. 29, 2018

Related U.S. Application Data

(60) Provisional application No. 62/401,105, filed on Sep. 28, 2016.

(51) Int. Cl.
| | |
|---|---|
| *G05B 19/4099* | (2006.01) |
| *G06F 21/60* | (2013.01) |
| *B33Y 50/02* | (2015.01) |
| *B29C 64/393* | (2017.01) |

(52) U.S. Cl.
CPC ........ *G05B 19/4099* (2013.01); *B29C 64/393* (2017.08); *B33Y 50/02* (2014.12); *G06F 21/608* (2013.01); *G05B 2219/35134* (2013.01); *G05B 2219/49007* (2013.01)

(58) Field of Classification Search
CPC ... G05B 19/4099; G06F 21/608; B33Y 50/02; B29C 64/393
See application file for complete search history.

(56) References Cited

PUBLICATIONS

Sturm, L.D., Williams, C. B., Camelio, J. A., White, J., and Parker, R., "Cyber-Physical Vunerabilities in Additive Manufacturing Systems"; Context 7 (2014).
Hudson, Robb; "Hybrid system combines additive subtractive manufacturing"; Aerospace Manufacturing and Design; http://www.aerospacemanufacturinganddesign.com/article/hybrid-system-combines-additive-subtractive-manufacturing/; Aug. 15, 2016.
Waam; "Additive Manufacturing (AM)"; Wire + Arc Additive Manufacturing; Jun. 14, 2016 (date located through https://web.archive.org/web/20160614215625/https://waammat.com/about/waam).
Sciaky Inc. "Advantages of Wire AM vs. Powder AM"; Dec. 24, 2016 (date located through https://web.archive.org/web/20161224045324/http://www.sciaky.com/additive-manufacturing/wire-am-vs-powder-am).

(Continued)

*Primary Examiner* — Vincent H Tran
(74) *Attorney, Agent, or Firm* — Thomas E. Lees, LLC

(57) ABSTRACT

A computer-implemented process is disclosed for securely transmitting a three-dimensional part file, e.g., to a parts manufacturer or storage location. A method is also provided for creating a three-dimensional part capable of integrity validation is provided. Also, a method is provided, for validating the integrity of a three-dimensional part in an additive manufacturing. Yet further, a method is provided for qualifying a part created by additive manufacturing. Moreover, systems are provided for carrying out one or more of the above.

23 Claims, 5 Drawing Sheets

(56) References Cited

PUBLICATIONS

Tammas-Williams, Samuel, Withers, Philip J., Todd, Iain, and Prangnell, Philip B.; "The Effectiveness of Hot Isostatic Pressing for Closing Porosity in Titanium Parts Manufactured by Selective Electron Beam Melting"; Metallurgical and Materials Transactions A; vol. 47A, May 2016.

Redwood, Ben; "Post processing for SLS printed parts"; 3D Hubs; Jul. 9, 2017 (date located through https://web.archive.org/web/20170709025718/https://www.3dhubs.com/knowledge-base/post-processing-sls-printed-parts).

Moylan, Shawn, Slotwinksi, John, Cooke, April, Jurrens, Kevin, and Donmez, Alkan M.; "An Additive Manufacturing Test Artifact"; Journal of Research of the National Institute of Standards and Technology; vol. 119; Oct. 23, 2014.

Department of Defense Small Business Innovation Research (SBIR); "Securitiy in Cyber-Physical Networked Systems"; Retrieved Apr. 19, 2016, from https://www.sbir.gov/sbirsearch/detail/697260.

Chhetri, Sujit Rokka, Arquimedes Canedo, and Mohammad Abdullah Al Faruque; "Poster: Exploiting Acoustic Side-Channel for Attack on Additive Manufacturing Systems"; NDSS; Feb. 2016.

Neugebauer, F., Keller, N., Ploshikhin, V., Feuerhahn, F., and Kohler, H.; "Multi Scale FEM Simulation for Distortion Calculation in Additive Manufacturing of Hardening Stainless Steel"; International Workshop on Thermal Forming and Welding Distortion; Bremen, Germany; Apr. 9-10, 2014.

Paulsen, Celia; "Proceedings of the Cybersecurity for Direct Digital Manufacturing (DDM) Symposium"; National Institute of Standards and Technology (NISTIR 8041); pp. 1-22; Apr. 2015.

Paulsen, Celia; "Proceedings of the Cybersecurity for Direct Digital Manufacturing (DDM) Symposium"; National Institute of Standards and Technology (NISTIR 8041); pp. 23-50; Apr. 2015.

Paulsen, Celia; "Proceedings of the Cybersecurity for Direct Digital Manufacturing (DDM) Symposium"; National Institute of Standards and Technology (NISTIR 8041); pp. 51-F-2; Apr. 2015.

DETECTION OF THE INTEGRITY OF ADDITIVELY MANUFACTURED PARTS

CROSS REFERENCE TO RELATED APPLICATIONS

This application claims the benefit of U.S. Provisional Patent Application Ser. No. 62/401,105, filed Sep. 28, 2016, entitled DETECTION OF THE INTEGRITY OF ADDITIVELY MANUFACTURED PARTS, the disclosure of which is hereby incorporated herein by reference.

BACKGROUND

Various aspects of the present disclosure relate generally to integrity verification artifacts, and more particularly, to techniques that utilize at least one integrity verification artifact to detect the integrity of a manufactured part.

Various manufacturing techniques and technologies exist for the manufacture of three-dimensional parts. Most recently, a collection of technologies, generally referred to as "additive manufacturing" has emerged as an effective way to manufacture limited quantities of parts. In general, additive manufacturing techniques synthesize three-dimensional part by forming each part in successive layers. The layers are formed under computer control based upon a data file, e.g., a digital model data file, three-dimensional model file, Additive Manufacturing File (AMF) etc. In this manner, a part can be manufactured exhibiting virtually any shape or geometry that can be adequately characterized in the corresponding data file describing the part.

BRIEF SUMMARY

According to aspects of the present disclosure, a computer-implemented process is disclosed for securely transmitting a three-dimensional part file, e.g., to a parts manufacturer or storage location. The process comprises constructing additive manufacturing control code. Here, the additive manufacturing control code comprises code that describes a three-dimensional part for manufacture by a corresponding additive manufacturing machine (e.g., as described more fully herein). The additive manufacturing control code also comprises code that describes an integrity verification artifact that corresponds to an integrity check on an instance of the three-dimensional part described by the additive manufacturing control code, such that the integrity verification artifact is manufactured along with the instance of the three-dimensional part (again, as described more fully herein). The process also comprises transmitting the additive manufacturing control code to a manufacturer for execution to manufacture a three-dimensional part instance and corresponding integrity verification artifact.

According to further aspects of the present disclosure a method of creating a three-dimensional part capable of integrity validation is provided. The method comprises using an additive manufacturing process to manufacture an instance of a three-dimensional part according to a specification provided in a control file. The method also comprises using the additive manufacturing process to manufacture an instance of an integrity verification artifact that corresponds to an integrity check on the instance of the three-dimensional part. The method further comprises linking physically, the integrity verification artifact to the three-dimensional part.

According to yet further aspects of the present disclosure, a method of validating the integrity of a three-dimensional part in an additive manufacturing process is provided. The method comprises obtaining a first instance of an integrity verification artifact that is associated with an instance of a three-dimensional part produced by an additive manufacturing process. The method also comprises performing at least one test on the first instance of the integrity verification artifact to verify that the artifact conforms to a predetermined specification. Also, the method comprises conveying an indication that the instance of the three-dimensional part passes or fails a predetermined qualification based upon the evaluation of the first instance of the integrity verification artifact.

DETAILED DESCRIPTION

Figure 1:
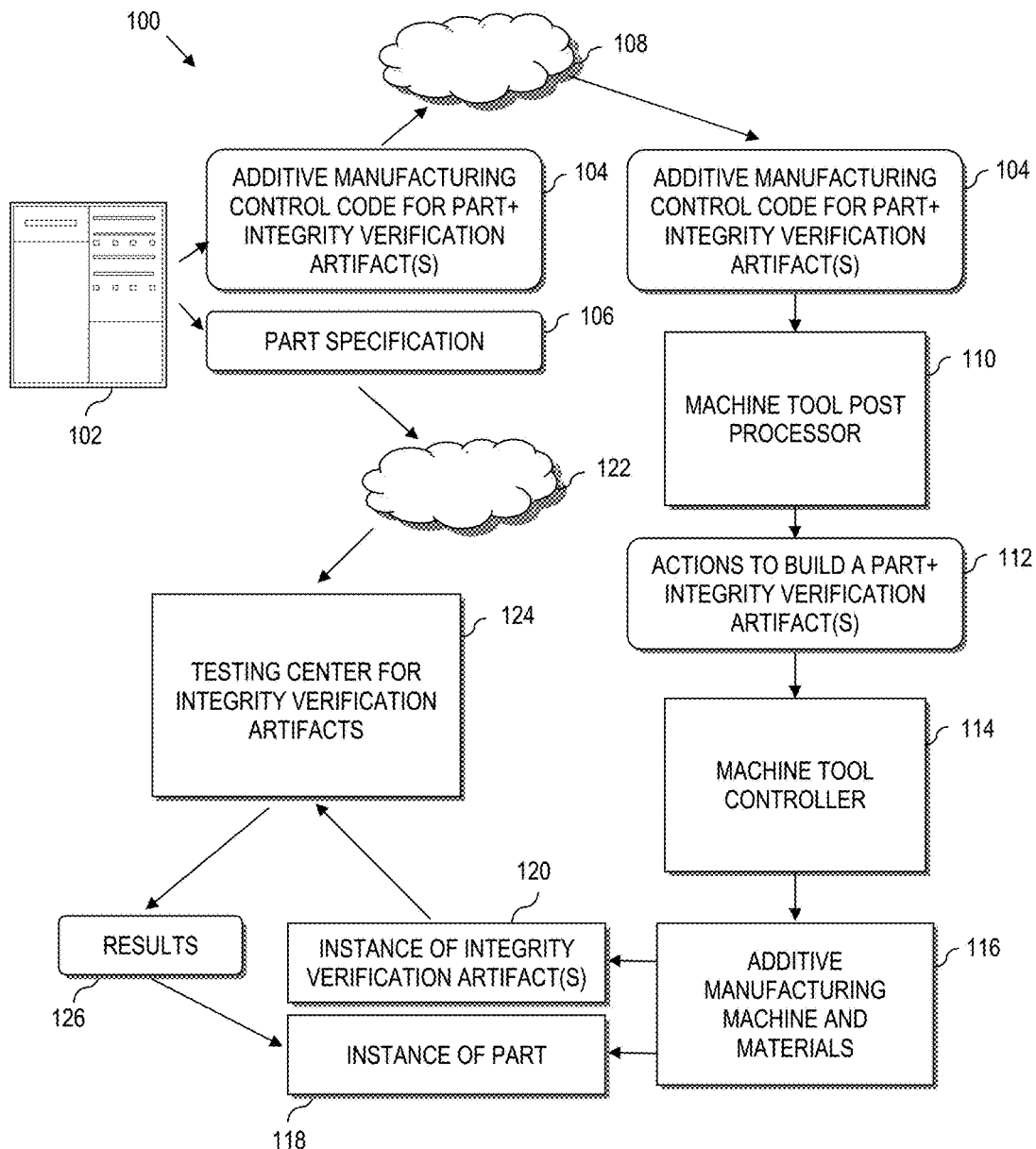
FIG. 1 is a system that can be utilized to test the integrity of additively manufactured parts according to aspects of the present disclosure.

Modern manufacturing processes, e.g., additive manufacturing, provide a flexible and convenient way to manufacture a part on demand. Added convenience and flexibility is brought about because the additive manufacturing machine manufactures an instance of the desired part based upon instructions received from additive manufacturing control code. As used herein, the phrase "additive manufacturing control code" is to be construed broadly to include any electronic data used to control an additive manufacturing process, e.g., digital model data, a three-dimensional model data file, an Additive Manufacturing File (AMF), stereolithography file (STL), computer-aided design (CAD) file, libraries used thereby, combinations thereof, alternatives thereto, etc.

However, the flexibility of file-driven manufacturing creates opportunities for a part to be manufactured out of specification. A part manufactured out of specification can result from accident or unintended consequences, e.g., uncalibrated machine parts, machine components out of alignment, wrong file loaded, wrong materials loaded, etc.

However, a part can also be manufactured out of specification due to nefarious or otherwise malicious intent. This can happen at the location of manufacture, or via third-party interference. For instance, malware, file modifications, and other software-related means can be used to cause an additive manufactured part to be out of specification.

However, aspects of the present disclosure herein provide techniques to detect whether an additively manufactured part has been tampered with, or deviates from a designated parts specification. Aspects herein further provide such techniques so as to detect anomalies that jeopardize the integrity of an additive manufactured part without requiring extensive destructive and/or non-destructive inspection of the part itself. Still further, techniques herein prevent stealing and/or tampering with a part description, parts specification, or combination thereof.

Aspects of the present disclosure herein are useful, especially in the manufacture of mission critical parts. For instance, a mission critical part may comprise a part where failure of the part may lead to material losses, machine failure or damage, etc. Aspects herein provide a level of trust that an additive manufactured part meets designed-for specifications, even when manufacturing is outsourced.

In this regard, aspects of the present disclosure address a technical problem of additive manufacturing parts verification by providing a technical solution characterized by code that describes a three-dimensional part for manufacture by a corresponding additive manufacturing machine, and code that describes an integrity verification artifact that corresponds to an integrity check on an instance of the three dimensional part, such that the integrity verification artifact is manufactured along with the instance of the three-dimensional part. The generation of an integrity verification artifact (or multiple artifacts) provides a new and completely different approach to the verification of additively manufactured parts. Notably, in the present disclosure, the critical features, components, aspects, etc., of the part to be built are reflected as artifact(s) without necessarily building an entire instance of a part that would otherwise be sacrificed for testing. This avoids the time, expense and delays required by conventional approaches of building a sacrificial part. Moreover, this approach is not adversely affected by insignificant variances, e.g., slight movements of voids or other features that do not affect performance of the part evaluated at the testing center, thus improving previous approaches.

Overview

Referring now to the drawings and in particular to FIG. 1, an overview of a system 100 is provided for carrying out aspects of the present disclosure. An authoring tool 102 generates additive manufacturing control code 104 for the manufacture of a part. In an example implementation, the additive manufacturing control code 104 describes a three-dimensional part for manufacture by a corresponding additive manufacturing machine and code that describes an integrity verification artifact that corresponds to an integrity check on an instance of the three dimensional part, such that the integrity verification artifact is manufactured along with the instance of the three-dimensional part.

The authoring tool 102 also generates a parts specification 106 corresponding to the additive manufacturing control code 104. In practice, the authoring tool 102 is a processing device, which can be implemented in practice as one or more of a computer, server, processing device, special purpose machine, test and measurement machine, inspection machine, combinations thereof, etc., that are operated by a parts manufacturer, designer, or other source that creates the part to be manufactured.

Analogous to that noted above, the additive manufacturing control code 104 is to be construed broadly to include any electronic data used to control an additive manufacturing process by providing an electronic description of the part. In this regard, the additive manufacturing control code 104 may comprise a description of the part as digital model data, three-dimensional model data file, an Additive Manufacturing File (AMF), stereolithography file (STL), computer-aided design (CAD) file, etc. In this regard, the additive manufacturing control code 104 can also include or otherwise link or integrate with libraries additional files, combinations thereof, alternatives thereto, etc.

However, uniquely to the present disclosure, the additive manufacturing control code includes code that describes the part (e.g., a three-dimensional part) and at least one integrity verification artifact. Integrity verification artifacts are described in greater detail below.

The parts specification 106 comprises information that defines a parts specification. This can include information describing the part, e.g., shape, size, color, tolerances, measurements, etc., detailed testing instructions, structural requirements, material finish, microstructure, or any other measures that are relevant to the ability determine whether an instance of the part that is manufactured is within specification.

In practical applications, the additive manufacturing control code 104 and/or the parts specification 106 can be securely transmitted, e.g., using a hash function, using encryption, using a virtual private network, etc.

In an example implementation, the additive manufacturing control code is transmitted to a manufacturer for execution to manufacture a three-dimensional part instance and corresponding integrity verification artifact. For instance, as illustrated, the additive manufacturing control code 104 is communicated across a network 108 to a manufacturer, and is loaded into a machine tool post processor 110. The network 108 provides communication links between the various processing devices, e.g., the authoring tool 102 and the machine tool post processor 110. Accordingly, the network 108 may be supported by networking components such as routers, switches, hubs, firewalls, network interfaces, wired or wireless communication links and corresponding interconnections, cellular stations and corresponding cellular conversion technologies, e.g., to convert between cellular and TCP/IP, etc. Such devices are not shown for purposes of clarity. Moreover, the network 108 may comprise connections using one or more intranets, extranets, local area networks (LAN), wide area networks (WAN), wireless networks (WIFI), the Internet, including the world wide web, a cloud, and/or other arrangements for enabling communication between the processing devices, in either real time or otherwise, e.g., via time shifting, batch processing, etc.

The machine tool post processor 110, which can be any form of processing device, examples of which are set out above. Regardless, the machine tool post processor 110 converts the additive manufacturing control code 104 into an actions file 112 to build an instance of a part and at least one integrity verification artifact. The actions file 112 comprises machine code describing actions carried out by the particular additive manufacturing machine to build the part and the one or more integrity verification artifacts.

The actions file 112 is loaded into a machine tool controller 114, which controls an additive manufacturing machine 116 to build an instance of the part 118 and the associated integrity verification artifact(s) 120. Here, the additive manufacturing machine 116 can include any type of additive manufacturing machine (including hybrid additive and subtractive machines), including sub-components or auxiliary components thereof, e.g., lasers, stepper motors, conveyor, feeders, actuators, mixers, etc.

The parts specification 106 is communicated across a network 122 to a testing center 124. Here, the network 122 is analogous to, and can be the same as, the network 108. The testing center 124 also receives the instance of the part 118, the integrity verification artefact(s) 120, or both. Using the parts specification 106, which is independent of the additive manufacturing control code 104, the testing center 124 conducts tests to verify whether the part is likely to conform with the associated specifications (e.g., form, fit, and function). Here, testing can comprise verification, validation, or a combination thereof. For instance, if the instance of the part 118 is received, measurements can be taken of the instance of the part 118 based upon the parts specification 106, e.g., to verify form, fit, function, etc.

According to a first aspect of the present disclosure, an instance of a integrity verification artifact 120 can be produced as a single unit, in duplicate or in triplicate. This allows different testing to be done, depending upon the necessity of verification described in the parts specification 106. For instance, a first instance of the integrity verification artifact can undergo non-destructive (or destructive) microstructure analysis. A second instance of the integrity verification artifact can undergo destructive testing (e.g., chemical testing, mechanical testing, or both), e.g., to test loading sheer forces, to perform stress analysis, to measure fatigue, modes of failure, distortion, etc. A third instance of the integrity verification artifact can be used for validation by calculating how the instance of the part 118 will perform in an intended environment, how the instance of the part 118 will perform after post processing (e.g., hot isostatic pressing (HIP), heat treatment, etc.), or both (i.e., simulating the part).

Upon completing the evaluation, the testing center 124 generates results 126, which are coupled with the instance of the part 118. If the instance of the part 118 and/or the instance(s) of the integrity verification artifact(s) satisfy the evaluation, the instance of the part 118 is deemed suitable for use.

The above system 100 uniquely provides a framework that can assert assurances that parts specifications will be adequately protected from intentional or unintentional changes after they leave the authoring tool 102. Moreover, the system can detect tampering and whether the instance of the part is within a predetermined specification. For instance, regardless of whether unintentional or nefarious acts, should the additive manufacturing control code 104 become modified, contaminated, infected, or otherwise altered, such modifications that result in unfit part manufacture are flagged. Also, the system 100 herein can provide assurances that the required manufacturing processes or materials were used. Again, such issues can be timely flagged. Notably, such testing is carried out without requiring destructive testing of the part itself.

In this instance, a result 126 that is negative can trigger a workflow, e.g., to inspect the additive manufacturing control code 104, machine tool post processor 110, machine tool controller 114, etc., to find the cause of the deviation.

Moreover, timeliness in delivery of time-sensitive parts are not delayed by insignificant variances, e.g., slight movements of voids or other features that do not affect performance of the part evaluated at the testing center 124.

The system 100 is shown by way of illustration, and not by way of limitation, as a computing environment in which various aspects of the present disclosure may be practiced. Other configurations may alternatively be implemented.

Integrity Verification Artifact

As used herein, an integrity verification artifact is an object that is created at the time the part is created. The integrity verification artifact is typically smaller than the part and represents equivalents of the part, represents other features of the part, or both, which enables an evaluation of the part short of destructive or non-destructive testing of the part itself.

As a few illustrative examples, an integrity verification artifact can comprise an ectype or other representation of the part intended for similarity analysis. As an example, the part designer may identify a feature (e.g., a sensitive, critical, or other relevant aspect of the part; microstructure of the part, strength of the part, etc.). The integrity verification artifact can thus be represented as a clone of just that feature without cloning the entire part. Alternatively, the integrity verification artifact may not be a direct clone of the feature. Rather, the integrity verification artifact may require some physical deviation that permits similarity testing so long as the integrity verification artifact clones the identified feature, e.g., ability to withstand certain fatigue parameters, stress parameters, loading parameters, etc., (i.e., represents the specification of interest in a manner similarly (and preferably identically) to that of the part itself. Thus, the integrity verification artifact imitates the important specification of the part. This allows the integrity verification artifact(s) to stand in place of the part itself for testing purposes, including destructive testing.

As an example, assume a part is complex, but the critical feature is a ball joint that necks into a shoulder. The neck is a point of weakness and must meet certain fatigue and shear requirements. An example integrity verification artifact can comprise a clone of the ball joint (or partial ball joint), neck and shoulder (or partial shoulder), along with any additional non-cloned structure necessary to simulate the actual part being tested. Here, the integrity verification artifact need not include the remainder of the complex shape of the actual part. Thus, location-specific stresses in the integrity verification artifact will be identical to location-specific stresses in the part itself, without building an artifact of the entire part. As such, functional integrity of the part is tested by capturing a fatigue response, shear response, or both of the integrity of the part and comparing the response(s) with specified location-specific requirements of the part (form, fit, function).

As another example, an integrity verification artifact need not be a clone or partial clone of the part or component part thereof. As an example, an integrity verification artifact can comprise a vessel or container that is additively manufactured. During the additive manufacturing process, the vessel can capture and enclose a sample of the raw material, e.g., powder. This preserves a record of the actual material used to build the part. This vessel can be in the shape of a sphere or other tamper-proof object. Moreover, the vessel can be hidden, e.g., by building the vessel or hidden storage compartment inside a shell of an integrity verification artifact.

In example implementations, each desired integrity verification artifact is built layer-by-layer alongside the corresponding instance of a part. As such, the integrity verification artifacts are manufactured alongside the part. For further security, one or more (e.g., each) integrity verification artifact can be welded by the additive manufacturing process to the part itself. As another example, the manufacturer may be required to surrender a build plate or substrate upon which the instance of the part and the corresponding integrity verification artifacts are additively manufactured. The end customer can break the welds to detach each integrity verification artifact from the part (or alternatively break the part and integrity verification artifacts from the surrendered build plate).

For instance, a digital identity can be defined by one or more of the machine; powder, feedstock, or material(s); processing parameters at all time, X, Y, and Z locations; geometry; microstructure; surface roughness; how the part will be used in the real world (e.g., loading conditions, fatigue requirements, etc.); post processing (HIP, heat treatment, etc.); and so on. The instance of the part being additively manufactured must meet the digital identity of the part as designed to be useful in demanding applications.

As noted above, each integrity verification artifact can have one or more instances (i.e., replicates), e.g., an instance designated for microstructure analysis, an instance designated for destructive testing, an instance designated for simulation, etc. Moreover, there can be multiple types of integrity verification artifacts. In practice, the number of integrity verification artifacts will vary depending upon the complexity of the part and based upon the complexity of the corresponding specifications.

One approach herein is to take the variables that define the digital identity of the part and cluster them to identify how many different integrity verification artifacts are necessary.

A side effect of the approach herein, is that every part is tested via equivalence testing using corresponding integrity verification artifacts, resulting in 100% quality control. There is no need to base quality on statistical probabilities based upon testing only a sample of parts manufactured.

By way of example, a specification may dictate one or more of form, fit, and function. Form and fit can be verified non-destructively by measuring the instance of the part. However, functionality may require destructive testing. However, according to aspects of the present disclosure, one or more integrity verification artifacts are built by the additive manufacturing process at the same time as, but outside the manufacture of the part.

Referring generally to FIGS. 2-5, methods are provided. In this regard, the methods may be implemented on computer-readable hardware that stores machine-executable program code, where the program code instructs a processor to implement the described method. The methods may also be executed by a processor coupled to memory, where the processor is programmed by program code stored in the memory, to perform the described method. Still further, the methods may be carried out by a combination of special purpose machines (e.g., additive manufacturing machines) and processors such as computers, servers, etc.

Figure 2:
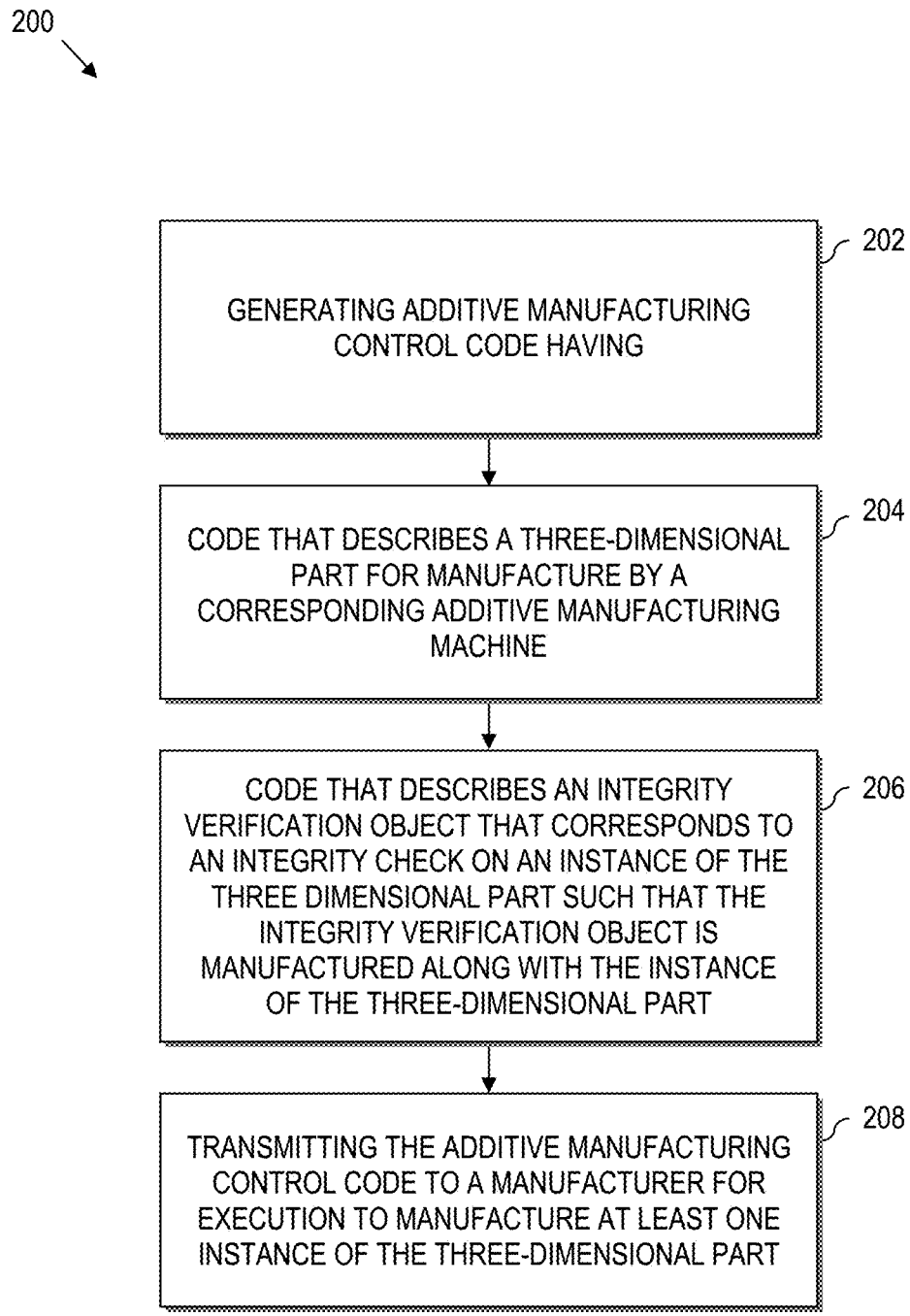
FIG. 2 is a flow chart illustrating a computer-implemented process for securely transmitting a three-dimensional part file, e.g., to a parts manufacturer or storage location, according to aspects of the present disclosure.

Referring to FIG. 2, a computer-implemented process 200 is disclosed for securely transmitting a three-dimensional part file, e.g., to a parts manufacturer or storage location.

The process 200 comprises constructing at 202, additive manufacturing control code. Here, the control code has code 204 that describes a three-dimensional part for manufacture by a corresponding additive manufacturing machine (e.g., as described more fully above).

The control code also has code 206 that describes an integrity verification artifact that corresponds to an integrity check on an instance of the three dimensional part such that the integrity verification artifact is manufactured along with the instance of the three-dimensional part (again, as described more fully above.

The process 200 also comprises transmitting at 208, to a manufacturer, the additive manufacturing control code for execution to manufacture a three-dimensional part instance and corresponding integrity verification artifact.

In an example implementation, the process further comprises securing the additive manufacturing control code before transmitting the additive manufacturing control code to the manufacturer. Securing the additive manufacturing control code can comprise applying a hash function to the additive manufacturing control code. As another example, securing the additive manufacturing control code can comprise encrypting the additive manufacturing control code. As yet another example, securing the additive manufacturing control code can be carried out by transmitting the control code across a virtual private network.

In a further example implementation, generating additive manufacturing control code having code that describes an integrity verification artifact comprises generating an integrity verification artifact that verifies at least one pre-defined functional aspect of the three-dimensional part. In yet a further example implementation generating additive manufacturing control code having code that describes an integrity verification artifact comprises generating an integrity verification artifact that duplicates a predetermined feature or set of features of the three-dimensional part. In still yet a further example implementation, generating additive manufacturing control code having code that describes an integrity verification artifact comprises generating an integrity verification artifact that creates an encapsulated vessel that contains un-melted material used to manufacture the three-dimensional part.

In certain embodiments, generating additive manufacturing control code comprises generating code that causes the additive manufacturing machine to weld the integrity verification artifact to the three-dimensional part; or that causes the additive manufacturing machine to form the integrity verification artifact and the three-dimensional part on the same base plate.

In yet further embodiments, the computer-implemented process comprises any combination of the preceding features.

Figure 3:
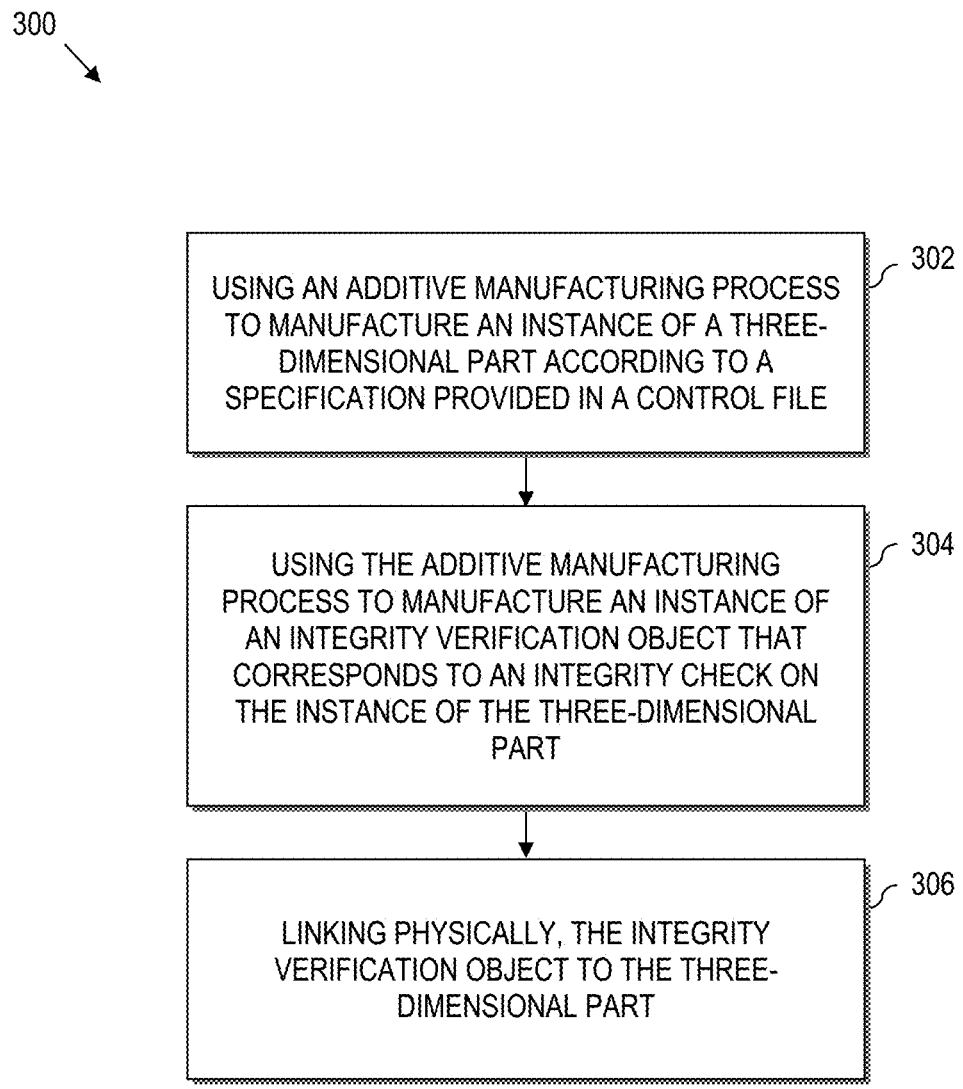
FIG. 3 is a flow chart illustrating a method of creating a three-dimensional part capable of integrity validation, according to aspects of the present disclosure.

Referring to FIG. 3, a method 300 of creating a three-dimensional part capable of integrity validation is provided. The method 300 comprises using at 302, an additive manufacturing process to manufacture an instance of a three-dimensional part according to a specification provided in a control file. The method 300 also comprises using at 304, the additive manufacturing process to manufacture an instance of an integrity verification artifact that corresponds to an integrity check on the instance of the three-dimensional part. The method further comprises linking physically at 306, the integrity verification artifact to the three-dimensional part.

In certain embodiments, the method further comprises using the additive manufacturing process to manufacture at least one additional instance of the integrity verification artifact, wherein a first instance of the integrity verification artifact is designated for non-destructive testing (e.g., micro-computed-tomography (micro-CT) for defect analysis), and a second instance of the integrity verification artifact is designated for destructive testing.

In certain additional embodiments, the method further comprises using the additive manufacturing process to manufacture at least two additional instances of the integrity verification artifact, wherein a first instance of the integrity verification artifact is designated for non-destructive testing, a second instance of the integrity verification artifact is designated for destructive testing, and a third instance of the integrity verification artifact is designated for simulation evaluation by using analytical calculations for qualifying the part.

In certain embodiments, linking physically, the integrity verification artifact to the three-dimensional part comprises using additive manufacturing process to weld the integrity verification artifact to the instance of the part. As another example, linking physically, the integrity verification artifact to the three-dimensional part can comprise using additive manufacturing process to secure the integrity verification artifact and the to the instance of the part via a base plate upon which the instance of the three-dimensional part and the instance of the integrity verification artifact are manufactured.

According to still further embodiments, using the additive manufacturing process to manufacture an instance of an integrity verification artifact that corresponds to an integrity check comprises using the additive manufacturing process to manufacture a replicate of a portion of the instance of the three-dimensional part necessary to test a predefined functionality.

In further example embodiments, using the additive manufacturing process to manufacture an instance of an integrity verification artifact that corresponds to an integrity check comprises using the additive manufacturing process to manufacture a replicate of a portion of the instance of the three-dimensional part necessary to test a at least one of a predetermined load requirement, a predetermined stress state requirement, or a predetermined fatigue life requirement.

In still further example embodiments, using the additive manufacturing process to manufacture an instance of an integrity verification artifact that corresponds to an integrity check comprises using the additive manufacturing process to manufacture a completely concealed vessel that collects additive manufacturing material used to manufacture the instance of the three-dimensional part.

In yet further embodiments, using the additive manufacturing process to manufacture an instance of an integrity verification artifact that corresponds to an integrity check comprises using the additive manufacturing process to manufacture a hidden vessel that completely encloses a vessel that stores collected additive manufacturing material used to manufacture the instance of the three-dimensional part.

In yet further example embodiments, the method 300 can comprise any combination of the above features.

Figure 4:
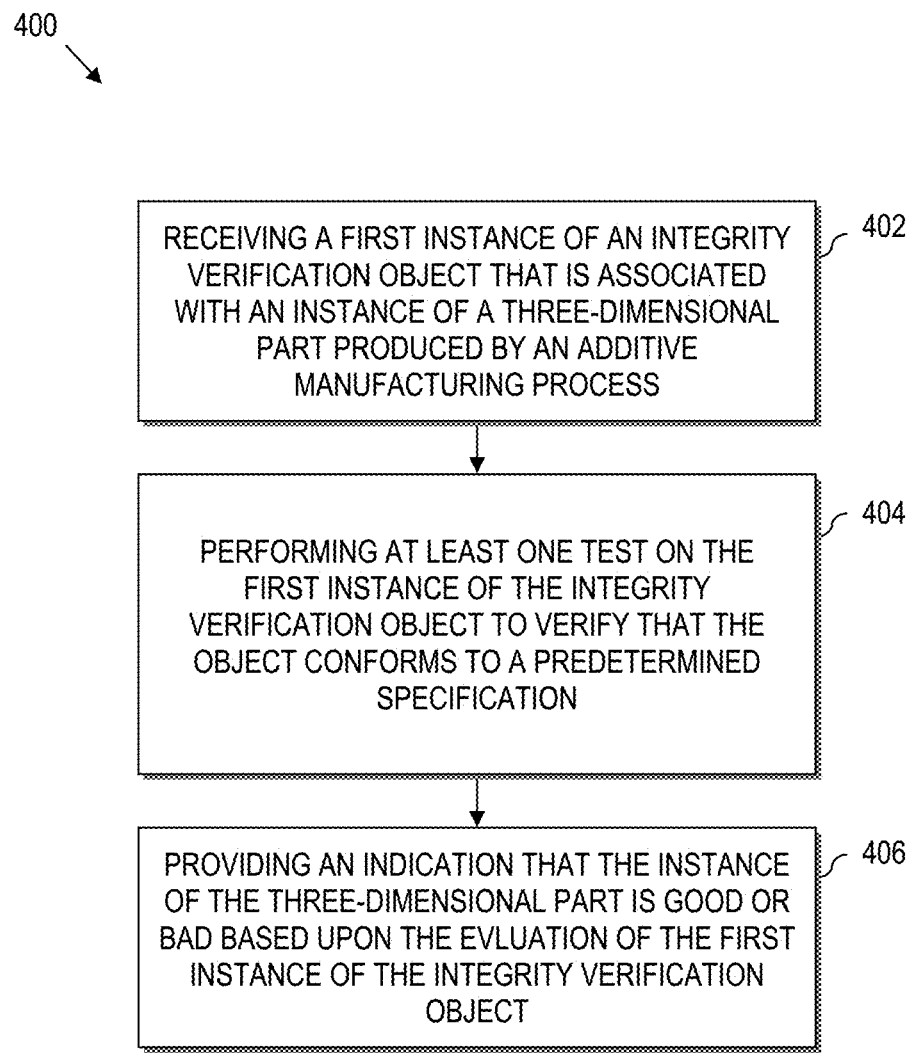
FIG. 4 is a flow chart illustrating a method of validating the integrity of a three-dimensional part in an additive manufacturing process, according to aspects of the present disclosure.

Referring to FIG. 4, a method 400 of validating the integrity of a three-dimensional part in an additive manufacturing process is provided. The method comprises obtaining at 402, a first instance of an integrity verification artifact that is associated with an instance of a three-dimensional part produced by an additive manufacturing process.

The method 400 also comprises performing at 404, at least one test on the first instance of the integrity verification artifact to verify that the artifact conforms to a predetermined specification.

Also, the method 400 comprises providing at 406, an indication that the instance of the three-dimensional part is good or bad based upon the evaluation of the first instance of the integrity verification artifact.

In certain example embodiments, performing at least one test comprises performing non-destructive microstructure analysis of the first instance of the integrity verification artifact.

In at least one example embodiment, performing at least one test comprises performing destructive analysis of the first instance of the integrity verification artifact. In an alternative embodiment, performing at least one test comprises performing at least one simulation on the first instance of the integrity verification artifact.

In further example embodiments, the method 400 further comprises receiving a second instance of the integrity verification artifact that is associated with an instance of a three-dimensional part produced by an additive manufacturing process, performing non-destructive microstructure analysis of the first instance of the integrity verification artifact, and performing destructive analysis of the second instance of the integrity verification artifact.

In some example embodiments, the method 400 further comprises receiving a second instance and a third instance of the integrity verification artifact that is associated with an instance of a three-dimensional part produced by an additive manufacturing process, performing non-destructive microstructure analysis of the first instance of the integrity verification artifact, performing destructive analysis of the second instance of the integrity verification artifact, and performing a simulation analysis on the third instance of the integrity verification artifact.

In yet further example embodiments, the method 400 can comprise any combination of the above features.

Figure 5:
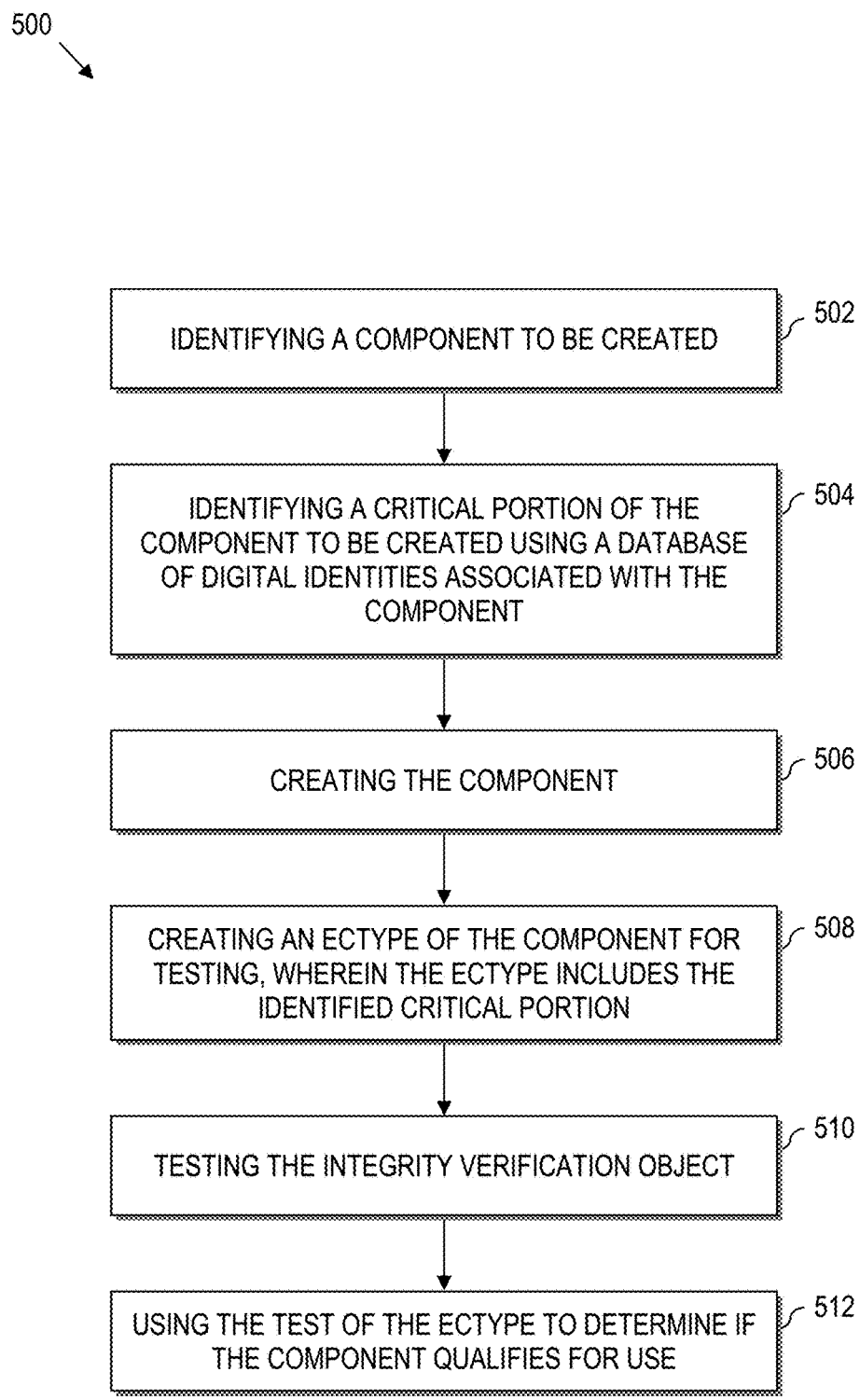
FIG. 5 is a flow chart illustrating a method for qualifying a part created by additive manufacturing, according to aspects of the present disclosure.

Referring to FIG. 5, a method 500 for qualifying a part created by additive manufacturing is provided. The method 500 comprises identifying at 502, a part to be created.

The method comprises identifying at 504, a critical portion of the part to be created using a database of digital identities associated with the part, and creating at 506 the part.

The method still further comprises creating at 508, an integrity verification object of the part for testing, wherein the integrity verification object includes the identified critical portion, and testing at 510, the integrity verification object.

The method still further comprises using at 512, the test of the integrity verification object to determine if the part qualifies for use.

In certain embodiments, identifying a critical portion of the part to be created further includes identifying a critical portion of the part to be created using a database of digital identities associated with the part, wherein, the digital identities comprise a trait that represents inherent features of the part and do not vary much over the part, and an attribute that represents acquired information that varies over the part.

In certain embodiments, identifying a critical portion of the part to be created further comprises identifying a critical portion of the part to be created using a database of digital identities associated with the part, wherein the trait concerns a microstructure of the part to be created. In another example embodiment, the microstructure of the part is found by analyzing beta grain morphology of the part to be created. In yet a further example embodiment, the microstructure of the part is found by analyzing crystallography of the part to be created.

In yet a further example embodiment, identifying a critical portion of the part to be created further comprises identifying a critical portion of the part to be created using a database of digital identities associated with the part, wherein the trait concerns a surface treatment of the part to be created. In still further example embodiments, identifying a critical portion of the part to be created further comprises identifying a critical portion of the part to be created using a database of digital identities associated with the part, wherein the attributes indicate a performance of the part under different external load conditions.

As yet another example, in some embodiments, identifying a critical portion of the part to be created further comprises identifying a critical portion of the part to be created using a database of digital identities associated with the part, wherein the trait concerns a geometry of the part to be created. In yet a further example, identifying a critical portion of the part to be created further comprises identifying a critical portion of the part to be created using a database of digital identities associated with the part, wherein the digital identity concerns predicting regions of homogeneity of the part to be created. In still further examples, identifying a critical portion of the part to be created further comprises identifying a critical portion of the part to be created using a database of digital identities associated with the part, wherein the digital identity concerns processing parameters of the part to be created.

Additional example embodiments comprise identifying a critical portion of the part to be created by identifying a critical portion of the part to be created using a database of digital identities associated with the part, wherein the processing parameters include an indication that the part is to be created using various additive/subtractive manufacturing techniques, laser and powder bed fusion, wire feed, electron beam, computer controlled machining, combinations thereof, etc. As yet further examples, identifying a critical portion of the part to be created further comprises identifying a critical portion of the part to be created using a database of digital identities associated with the part, wherein the processing parameters include an indication that the part is to be created using an electron beam and powder bed fusion.

Keeping with yet further examples, identifying a critical portion of the part to be created further comprises identifying a critical portion of the part to be created using a database of digital identities associated with the part, wherein the processing parameters include an indication that the part is to be created using direct metal deposition.

In still further examples, creating an integrity verification object of the part for testing further includes creating an integrity verification object of the part for testing, wherein the integrity verification object includes only a portion of the part for testing.

In yet still more examples, identifying a critical portion of the part further includes identifying a first critical portion of the part to be created using the database of variables affecting performance of the part, and identifying a second critical portion of the part to be created different than the first critical portion using the database of variables affecting performance of the part, and creating an integrity verification object of the part for testing further includes creating a first integrity verification object of the part for testing, wherein the first integrity verification object includes the first identified critical portion, and creating a second integrity verification object of the part for testing different than the first integrity verification object, wherein the second integrity verification object includes the second identified critical portion.

In certain embodiments, testing the integrity verification object includes using destructive testing to test the integrity verification object.

In yet further example embodiments, the method 500 can comprise any combination of the above features.

Miscellaneous

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Aspects of the disclosure were chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented process for securely transmitting a three-dimensional part file, the computer-implemented process comprising:
constructing additive manufacturing control code having:
code that describes a three-dimensional part for manufacture by a corresponding additive manufacturing machine; and
code that describes an integrity verification artifact that corresponds to an integrity check on an instance of the three dimensional part such that the integrity verification artifact is manufactured along with the instance of the three-dimensional part; and
transmitting the additive manufacturing control code to a manufacturer for execution to manufacture at least one instance of the three-dimensional part.

2. The computer-implemented process of claim 1 further comprising securing the additive manufacturing control code by applying a hash function to the additive manufacturing control code before transmitting the additive manufacturing control code to the manufacturer.

3. The computer-implemented process of claim 1, wherein constructing additive manufacturing control code having code that describes an integrity verification artifact comprises constructing an integrity verification artifact that verifies at least one pre-defined functional aspect of the three-dimensional part.

4. The computer-implemented process of claim 1, wherein constructing additive manufacturing control code having code that describes an integrity verification artifact comprises constructing an integrity verification artifact that duplicates a predetermined feature or set of features of the three-dimensional part.

5. The computer-implemented process of claim 1, wherein constructing additive manufacturing control code having code that describes an integrity verification artifact comprises constructing an integrity verification artifact that creates an encapsulated vessel that contains un-melted material used to manufacture the three-dimensional part.

6. The computer-implemented process of claim 1, wherein constructing additive manufacturing control code comprises constructing code that performs at least one of:
causing the additive manufacturing machine to weld the integrity verification artifact to the three-dimensional part; and
causing the additive manufacturing machine to form the integrity verification artifact and the three-dimensional part on the same base plate.

7. A method of creating a three-dimensional part capable of integrity validation comprising:
using an additive manufacturing process to manufacture an instance of a three-dimensional part according to a specification provided in a control file;
using the additive manufacturing process to manufacture an instance of an integrity verification artifact that corresponds to an integrity check on the instance of the three dimensional part; and
linking physically, the integrity verification artifact to the three dimensional part.

8. The method of claim 7 further comprising:
using the additive manufacturing process to manufacture at least one additional instance of the integrity verification artifact, wherein:
a first instance of the integrity verification artifact is designated for non-destructive testing; and
a second instance of the integrity verification artifact is designated for destructive testing.

9. The method of claim 7 further comprising:
using the additive manufacturing process to manufacture at least two additional instances of the integrity verification artifact, wherein:
a first instance of the integrity verification artifact is designated for non-destructive testing;
a second instance of the integrity verification artifact is designated for destructive testing; and
a third instance of the integrity verification artifact is designated for simulation evaluation.

10. The method of claim 7, wherein linking physically, the integrity verification artifact to the three-dimensional part comprises:
using additive manufacturing process to weld the integrity verification artifact to the instance of the part.

11. The method of claim 7, wherein linking physically, the integrity verification artifact to the three-dimensional part comprises:
using additive manufacturing process to secure the integrity verification artifact and the to the instance of the part via a base plate upon which the instance of the three-dimensional part and the instance of the integrity verification artifact are manufactured.

12. The method of claim 7, wherein:
using the additive manufacturing process to manufacture an instance of an integrity verification artifact that corresponds to an integrity check comprises using the additive manufacturing process to manufacture a replicate of a portion of the instance of the three dimensional part necessary to test a predefined functionality.

13. The method of claim 7, wherein:
using the additive manufacturing process to manufacture an instance of an integrity verification artifact that corresponds to an integrity check comprises using the additive manufacturing process to manufacture a replicate of a portion of the instance of the three dimensional part necessary to test a at least one of a predetermined load requirement, a predetermined stress requirement, or a predetermined fatigue requirement.

14. The method of claim 7, wherein:
using the additive manufacturing process to manufacture an instance of an integrity verification artifact that corresponds to an integrity check comprises using the additive manufacturing process to manufacture a concealed vessel that collects additive manufacturing material used to manufacture the instance of the three-dimensional part.

15. A method of validating the integrity of a three-dimensional part in an additive manufacturing process, comprising:
obtaining a first instance of an integrity verification artifact that is associated with an instance of a three-dimensional part produced by an additive manufacturing process;
performing at least one test on the first instance of the integrity verification artifact to verify that the artifact conforms to a predetermined specification that is extracted from additive manufacturing control code; and
conveying an indication that the instance of the three-dimensional part passes or fails a predetermined qualification based upon the evaluation of the first instance of the integrity verification artifact.

16. The method of claim 15, wherein performing at least one test comprises at least one of:
performing non-destructive microstructure analysis of the first instance of the integrity verification artifact;

performing destructive analysis of the first instance of the integrity verification artifact; and performing at least one simulation on the first instance of the integrity verification artifact.

17. The method of claim 15 further comprising:

receiving a second instance of the integrity verification artifact that is associated with an instance of a three-dimensional part produced by an additive manufacturing process;

performing non-destructive microstructure analysis of the first instance of the integrity verification artifact; and performing destructive analysis of the second instance of the integrity verification artifact.

18. The method of claim 15 further comprising:

receiving a second instance and a third instance of the integrity verification artifact that is associated with an instance of a three-dimensional part produced by an additive manufacturing process;

performing non-destructive microstructure analysis of the first instance of the integrity verification artifact;

performing destructive analysis of the second instance of the integrity verification artifact; and performing a simulation analysis on the third instance of the integrity verification artifact.

19. The method of claim 15 further comprising:

identifying a part to be created;

identifying a critical portion of the part to be created using a database of digital identities associated with the part, wherein the critical portion is identified according to at least one of:

the microstructure of the part is found by analyzing crystallography of the part to be created;

a trait concerns a surface treatment of the part to be created;

a trait concerns a geometry of the part to be created;

the attributes indicate a performance of the part under different external load conditions;

a digital identity concerns predicting regions of homogeneity of the part to be created;

a digital identity concerns processing parameters of the part to be created;

creating the part; and creating the first instance of the integrity verification artifact for testing, wherein the integrity verification artifact includes the identified critical portion.

20. The method of claim 19 further comprising assembling the first instance of the integrity verification artifact by:

identifying a critical portion of the part to be created using a database of digital identities associated with the part, wherein:

the digital identities comprise at least one of a trait that represents inherent features of the part and do not vary much over the part; a microstructure of the part to be created; and an attribute that represents acquired information that varies over the part.

21. The method of claim 19 further comprising assembling the first instance of the integrity verification artifact by identifying a critical portion of the part to be created using a database of digital identities associated with the part, wherein the digital identities comprise a microstructure found by analyzing beta grain morphology of the part to be created.

22. The method of claim 19 further comprising creating the first instance of the integrity verification artifact wherein only a portion of the part for testing.

23. The method of claim 19, wherein:

identifying a critical portion of the part further includes:

identifying a first critical portion of the part to be created using a database of variables affecting performance of the part; and identifying a second critical portion of the part to be created different than the first critical portion using the database of variables affecting performance of the part; and creating an integrity verification object of the part for testing further includes:

creating a first integrity verification object of the part for testing, wherein the first integrity verification object includes the first identified critical portion; and creating a second integrity verification object of the part for testing different than the first integrity verification object, wherein the second integrity verification object includes the second identified critical portion; and testing the integrity verification object includes using destructive testing to test the integrity verification object.

* * * * *